(12) United States Patent
Isaacs

(10) Patent No.: US 9,265,267 B2
(45) Date of Patent: Feb. 23, 2016

(54) OPEN TOP LIQUID/GAS CYCLONE SEPARATOR TUBE AND PROCESS FOR SAME

(71) Applicant: Garry Parkinson Isaacs, Rigby, ID (US)

(72) Inventor: Garry Parkinson Isaacs, Rigby, ID (US)

(*) Notice: Subject to any disclaimer, the term of this patent is extended or adjusted under 35 U.S.C. 154(b) by 137 days.

(21) Appl. No.: 13/998,649

(22) Filed: Nov. 20, 2013

(65) Prior Publication Data

US 2015/0020684 A1    Jan. 22, 2015

Related U.S. Application Data

(60) Provisional application No. 61/958,153, filed on Jul. 22, 2013.

(51) Int. Cl.

| | |
|---|---|
| *B01F 3/04* | (2006.01) |
| *B01D 45/12* | (2006.01) |
| *A23B 7/148* | (2006.01) |
| *B01D 50/00* | (2006.01) |
| *A23L 3/3409* | (2006.01) |
| *B01D 53/78* | (2006.01) |

(52) U.S. Cl.
CPC .............. *A23B 7/148* (2013.01); *A23L 3/34095* (2013.01); *B01D 45/12* (2013.01); *B01D 50/004* (2013.01); *B01D 53/78* (2013.01); *B01F 3/04049* (2013.01); *B01D 2252/103* (2013.01); *B01D 2257/504* (2013.01); *B01D 2257/91* (2013.01); *B01D 2258/0275* (2013.01)

(58) Field of Classification Search
CPC .......... B01F 3/04; B01D 45/12; B01D 50/004

USPC ............... 261/115; 55/426; 96/306, 313, 311, 96/355, 321

See application file for complete search history.

(56) References Cited

U.S. PATENT DOCUMENTS

| | | | | |
|---|---|---|---|---|
| 2,604,185 | A | * | 7/1952 | Anthony, Jr. et al. ............ 95/219 |
| 2,881,858 | A | * | 4/1959 | Kjell-Erik Sjalin et al. ..... 96/228 |
| 3,993,460 | A | * | 11/1976 | Gooch et al. ...................... 95/13 |
| 4,969,934 | A | | 11/1990 | Kusik |
| 6,231,645 | B1 | | 5/2001 | Conrad |

(Continued)

FOREIGN PATENT DOCUMENTS

| | | |
|---|---|---|
| WO | WO 2007/112976 | 10/2007 |
| WO | WO 2010/008431 | 7/2008 |

(Continued)

*Primary Examiner* — Robert A Hopkins
(74) *Attorney, Agent, or Firm* — MU Patents; Timothy Marc Shropshire

(57) ABSTRACT

Open top liquid/gas cyclone separator tube with a dual purpose single separator tube with both liquid and gas separation zones, an open top discharge vent to provide a for humid air to be discharged into the atmosphere, a means to prevent splashing out the open top of the separator tube, a means of the separation section to prevent turbulence while allowing the accumulation of used water in the bottom of the tube, a to provide gravity feeding of the water back to the scrubbing mechanism to be recycled for water preservation, a means of regulating the rate of water feed to the scrubbing mechanism, an open port means of the scrubbing mechanism to be used to add chemicals, gases or other elements to the gas stream that is discharged to the environment, and a for vertical discharge on the scrubbing mechanism to enhance entrainment of water droplets containing particles, bacteria and mold spores.

7 Claims, 2 Drawing Sheets

(56) References Cited

U.S. PATENT DOCUMENTS

Figure 1:
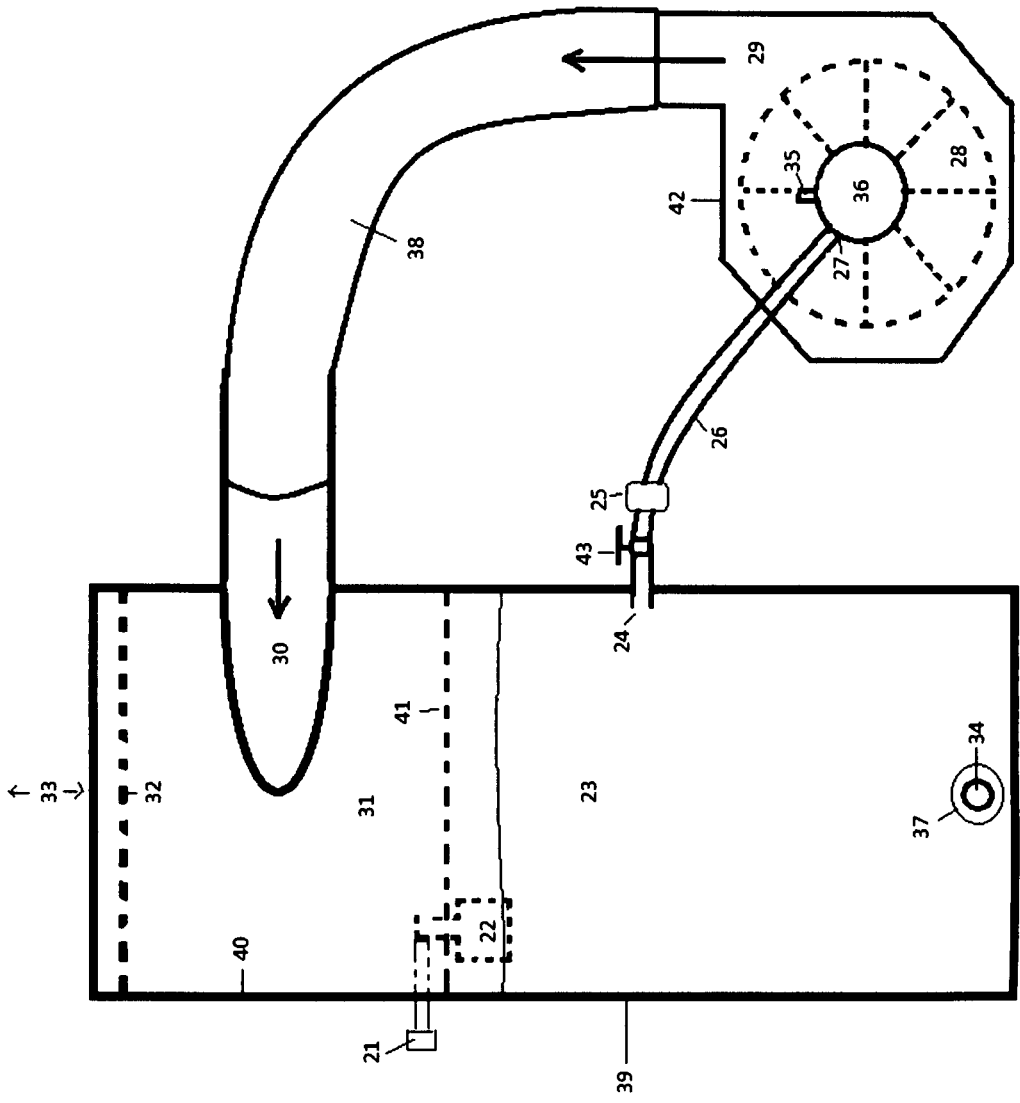
Figure 2:
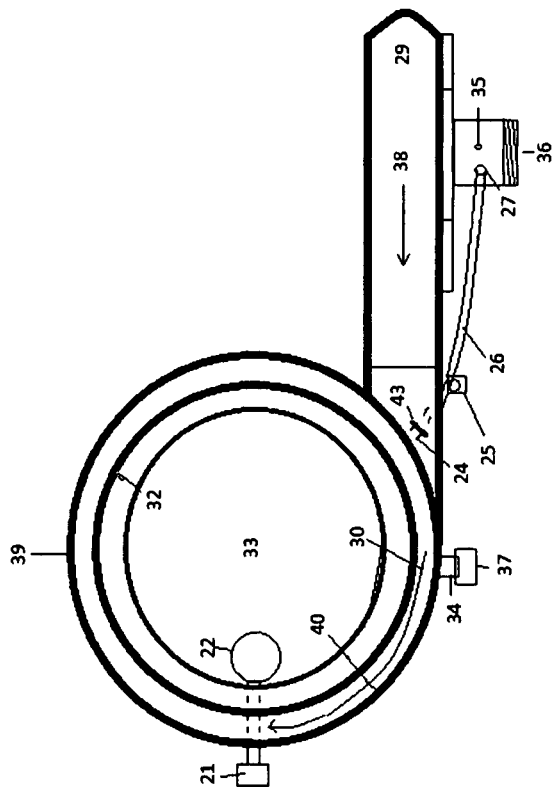

| | | |
|---|---|---|
| 6,905,537 B1 | 6/2005 | Isaacs |
| 7,025,808 B2 | 4/2006 | Huber |
| 8,083,838 B2 | 12/2011 | Yang |
| 8,293,120 B2 | 10/2012 | Pierson |
| 8,337,603 B2 | 12/2012 | Akhras |
| 8,343,360 B2 | 1/2013 | Schook |
| 8,366,802 B2 | 2/2013 | Olsson |
| 8,398,757 B2 | 3/2013 | Iijima |
| 8,425,665 B2 | 4/2013 | Duesel |
| 8,501,130 B1 | 8/2013 | Tsujiuchi |
| 8,540,788 B2 | 9/2013 | Fredheim |
| 8,572,944 B2 | 11/2013 | Chillar |
| 8,574,351 B2 | 11/2013 | Elms |

FOREIGN PATENT DOCUMENTS

| | | |
|---|---|---|
| WO | WO 2008/101532 | 8/2008 |
| WO | WO 2009/017914 A2 | 2/2009 |

* cited by examiner

OPEN TOP LIQUID/GAS CYCLONE SEPARATOR TUBE AND PROCESS FOR SAME

CROSS REFERENCE TO RELATED APPLICATIONS

This application is based on provisional application Ser. No. 61/958,153, filed on Jul. 22, 2013.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of room environment control and more specifically to open top liquid/gas cyclone separator tube and process for same. It has been known for centuries that food products deteriorate in quality on the shelf or in storage over time. The length of time it takes for the deterioration process is affected by the rate of food destroying pathogen population and regeneration. The length of time for preservation of food products in storage can be increased by the application of thermodynamic factors such as temperature, pressure and humidity. Refrigeration was discovered to increase the time for preservation of food products before its affect on microscopic pathogens was well understood. It has since been determined that (FILL IN WITH THERMODYNAMIC INFORMATION)

The most popular and effective preservation method for food products has been refrigeration. Keeping raw food products at low temperatures exponentially decreases the growth rate of product destroying pathogens and the products have been preserved for longer periods. Fresh food products must be kept at a delicate temperature range that is constantly above freezing and below a temperature that contributes to the rapid growth of pathogens. Since the production of food products has evolved into fewer and larger farms and storage facilities, the lack of thermodynamic knowledge of growers and the exuberant promotion by suppliers has moved preservation methods into larger and more powerful air handling facilities and mechanisms. Storage facilities for raw food products have been increased in size and capacity, costing upwards of $1 million per facility. These large facilities have been scaled both in size of storage area and also the size and capacity of air handling plenums used for air circulation.

Raw food product storage environment and product preservation has been addressed by opportunists more than by sound engineering. The industry has been addressing product volume that does not affect the environment instead of air volume that does. In potato storage units, fans have been increased in capacity of movement to as much as 2,200 cubic feet of air per minute per ton of potatoes. This translates to 165,000 cubic feet of air per minute in a 75 ton capacity storage unit. Assuming that there is 25% of the total air capacity of the unit left after it is full of product, the turnover rate would be approximately 3 times per minute, a substantial overkill that can be effective only for cooling purposes and not for environmental control. The running of these high capacity fans dries out the product and also moves pathogens from diseased products to healthy ones throughout the storage facility, thereby spreading and increasing the probability of product destroying diseases into every location of the facility. In an attempt to hold the humidity up in the storage while blowing high volumes of air through the product, the industry has provide atomizing impellers that atomize as much as 30 gallons of water per minute per unit. The smallest of droplets that can be produced by an efficient atomizer is approximately ten microns in diameter. Larger droplets are readily affected by gravity, pulling them to the floor of the facility and the ventilation tubes. The excess water provides a welcome environment for pathogens to reproduce and increase in population. Such a high volume of water only serves to wet the floors and walls of the plenums since the air will only contain a small amount of water, the capacity depending on the temperature in the facility. The only factor applicable to the humidity of the air in the facility with this method is evaporation. The evaporation rate decreases in the facility as temperature decreases because cold air holds much less water that warm air. Hence there has been a major overkill in an attempt to preserve potato and vegetable products in storage and a great deal of water is wasted in these processes.

In 2005, Isaacs patented a device, U.S. Pat. No. 6,905,537, to be used in the emissions control industries that effected the collection of vapors, dust, heavy metals and other particles from industrial emissions and room environments. The use of this device for the control of pathogens in a food storage facility was not effectively applicable before the present invention was created to preserve the humidity in a storage room, for the recycling of the air and the controlled application of additives to the environment.

BRIEF SUMMARY OF THE INVENTION

The primary object of the invention is To provide a healthy, pathogen free environment for storing food products such as fresh vegetables and fruits.

Another object of the invention is to provide humidity to prevent shrink and pressure bruise throughout a short or long term storage period.

Another object of the invention is to capture and remove airborne pathogens such as bacteria and mold spores on a consistent basis while allowing the discharge of humidity to the atmosphere.

A further object of the invention is to preserve food products in storage such as fruits and vegetables without the use of chemicals.

Yet another object of the invention is to reduce water use and airflow requirement for storage facilities and the related capital and operating costs.

Still yet another object of the invention is to reduce the buildup of carbon dioxide while providing a consistent supply of oxygen or nitrogen and near 100% pathogen free air.

Another object of the invention is to provide a means for preserving fruits and vegetables in rudimentary storages that have no plenums or high volume air systems.

Another object of the invention is to provide for the preservation of fruits and vegetables at higher temperatures for better flavor and cooking results.

A further object of the invention is to provide for the reduction of refrigeration costs by preserving fruit and vegetable products at higher temperatures.

Yet another object of the invention is to provide a means for collecting existing room humidity and replacing it with re-humidified air to overcome the problem of water molecule repulsion in a room environment.

Still yet another object of the invention is to reduce the capital and energy costs of storing and preserving food products.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed Open top liquid/gas cyclone separator tube comprising: a dual purpose single separator tube with both a liquid zone and a gas separation zone, an open top discharge vent to allow humid air to be discharged into the atmosphere, a retainer ring to prevent splashing out the open top of the separator tube, a retainer ring at the bottom of the separation section to prevent turbulence while allowing the accumulation of used water in the bottom of the tube, a discharge valve to provide gravity feeding of the water back to the scrubbing mechanism to be recycled for water preservation, a control valve to regulate the rate of water feed to the scrubbing mechanism, a port at the inlet of the scrubbing mechanism to be used to add chemicals, gases or other elements to the gas stream that is discharged to the environment, and a vertical discharge port on the scrubbing mechanism to enhance entrainment of water droplets containing particles, bacteria and mold spores.

In accordance with a preferred embodiment of the invention, there is disclosed a process for Open top liquid/gas cyclone separator tube comprised of a dual purpose single separator tube with both a liquid zone and a gas separation zone, an open top discharge vent to allow humid air to be discharged into the atmosphere, a retainer ring to prevent splashing out the open top of the separator tube, a retainer ring at the bottom of the separation section to prevent turbulence while allowing the accumulation of used water in the bottom of the tube, a discharge valve to provide gravity feeding of the water back to the scrubbing mechanism to be recycled for water preservation, a control valve to regulate the rate of water feed to the scrubbing mechanism, a port at the inlet of the scrubbing mechanism to be used to add chemicals, gases or other elements to the gas stream that is discharged to the environment, and a vertical discharge port on the scrubbing mechanism to enhance entrainment of water droplets containing particles, bacteria and mold spores.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. <1> is a plan side view of the invention.

FIG. <2> is a plan top view of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The open top liquid/gas separation apparatus is best explained by reference to a specific application and example, however, one skilled in the art will recognize the applicability of the method described by the invention to any air cleaning process. The open top 33 of the liquid/gas separation tube mechanism 39 will be recognized as a simple and effective feature of the invention when used in conjunction with the other components of the apparatus. The operation of the system is dependent on the motive force being created by a fan 28 or blower devise that is required to make the system functional. The invention is also dependent on a thorough mixing and wetting of particles and pathogens by a scrubber prior to its application for effective separation to occur. The liquid/gas separation tube 39, comprising of the following elements is smaller in diameter than a conventional cyclone separator and is most functional for particle and pathogen capture as a finishing step to the application of a dynamic multiple low pressure zone blower/scrubber 42 as described in U.S. Pat. No. 6,905,537, Isaacs, 2005. The separation tube 39 is intended to have a dual purpose that consists of a separation section 31 and a reservoir section 23. Air to be treated is vacuumed into a blower 28 where it is thoroughly mixed with water, contacting carbon dioxide, particles, bacteria and mold spores and other pathogens with water droplets by low pressure and collision and then the mixture of air, particles and water are discharged by the blower 28 in a vertical direction 29 through an attached pipe or hose 38 and delivered horizontally and tangentially 30 into the top quarter portion or separation section 31 of the separation tube 39. Tangential discharge causes the water containing the carbon dioxide, particles and pathogens to be driven centrifugally against the wetted round wall 40 of the separation section 31 of the liquid/gas separation tube 39 and drawn by gravity down the round wall 40 into a water reservoir 23 while the air is being discharges out the open top 33 of the separation section 31 of the separation tube 39 into the atmosphere. The open top 33 of the separation tube allows for liquid entrainment inside the tube 39 and a substantial decrease in velocity of the air being discharged which allows for the discharge of water saturated, humid air without the alternative high velocity systems driving larger droplets out of the tube top 33 into the atmosphere. A vortex much like that a hurricane with an eye that is less turbulent is created by the large open top 33, whereas a smaller discharge opening creates a higher velocity and turbulence that tends to drive large droplets out the top of a conventional cyclone separator along with the air. A simple retainer ring 32 is installed on the wall 40 near the top of the liquid/gas separation tube 39 to hold the centrifugally driven liquid to the wall 40 of the separation section 31 of the separation tube 39 to prevent splashing out the top while the water is being entrained on the wall 40. The water that is used as scrubber fluid is recycled through the blower/scrubber by discharging 24 a regulated portion by gravity through an open pipe or tube 26 through an orifice 27 at the suction side 36 of the blower/scrubber fan 28. A solenoid feeder valve 25 is used to allow the discharge of the scrubber fluid into the fan suction inlet 36 and to automatically close whenever the system is shut down. A smaller port 35 is also attached to the inlet suction side of the blower/scrubber for the introduction of gases such as oxygen or nitrogen or for adding soluble chemicals to be discharged with the humidified air by the separation tube 39. A drain means 34 is attached to the bottom of the separation tube along with an optional solenoid valve 37 for periodical draining of particulate and pathogen pregnant fluids. A means of adding makeup water to the separation tube 39 as water is evaporated by the system and delivered into the atmosphere is attached to the side of the separation tube 39 and a float valve 22 is provided to control the level of the fluid in the reservoir section of the separation tube 39. A retainer ring 41 is attached to the inside wall 40 of the separation tube 39 within a close proximity of the top level of the reservoir 23 to prevent swirling of the scrubber fluid and splashing inside the separation section 31 of the separation tube 39 by the high velocity discharge 30 of the air/water mixture inside the separation tube 39. Cleaned and humid air is allowed to be recycled by the invention back through the room containing the subject product or work area to replace particle and pathogen laden air that has been removed by the blower/scrubber 42. Vacuuming existing air through the blower/scrubber 42 and replacing the vacuumed air with humidified new air out the top 33 of the separation tube 39 overcomes the natural negative repulsion of water droplets that are suspended in the air to not mix readily with new humidified air before the air becomes saturated and condensation occurs.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An open top liquid/gas cyclone separator apparatus comprising:

a dual purpose single separator tube comprising:
- a separation section;
- a reservoir section;
- an open top to provide a means for air to be discharged into the atmosphere;
- a retainer ring at an upper portion of the separation section to prevent liquid from splashing out of the open top of the separator tube;
- a retainer ring at a bottom portion of the separation section to prevent turbulence and allow for the accumulation of used water in the reservoir section;
- a discharge valve; and
- a control valve; and a scrubbing mechanism in communication with the separator tube, the scrubbing mechanism comprising:
- a means to add chemicals, gases or other elements to the scrubbing mechanism;
- a blower; and
- a means of vertical discharge extending from the scrubbing mechanism, wherein the discharge valve is configured to provide gravity feeding of the water to the scrubbing mechanism to be recycled for water preservation, and wherein the control valve is configured to regulate the rate of water feed to the scrubbing mechanism.

2. The open top liquid/gas cyclone separator apparatus of claim 1, wherein the separator tube further comprises a drain means at a bottom portion of the reservoir section.

3. The open top liquid/gas cyclone separator apparatus of claim 1, wherein the separator tube further comprises a means for adding water to the separator tube.

4. The open top liquid/gas cyclone separator apparatus of claim 1, wherein the separator tube further comprises a float valve to control the level of water in the reservoir section.

5. A method of using the open top liquid/gas cyclone separator apparatus of claim 1 comprising the steps of:
- discharging the water from the reservoir section to the scrubbing mechanism;
- vacuuming air into the blower;
- mixing the air and water within the blower;
- discharging the air and water mixture into the separation section through the means of vertical discharge;

wherein the water is driven centrifugally against an inner wall of the separation section and is drawn by gravity down the inner wall into the reservoir section, and wherein the air is discharged out of the open top of the separator tube.

6. The method of using the open top liquid/gas cyclone separator apparatus of claim 5, wherein the air contains matter selected from group consisting of carbon dioxide, particles, bacteria, mold spores, and pathogens, wherein the matter is mixed with the water and is deposited into the reservoir section.

7. The method of using the open top liquid/gas cyclone separator apparatus of claim 5, further comprising the step of introducing the chemicals, gases or other elements to the scrubbing mechanism to be discharged with the air and water mixture.

* * * * *